United States Patent
Herold

(10) Patent No.: US 11,028,206 B2
(45) Date of Patent: *Jun. 8, 2021

(54) POLYMERIZABLE COMPOSITION FOR OPTICAL ARTICLES

(71) Applicant: PPG Industries Ohio, Inc., Cleveland, OH (US)

(72) Inventor: Robert D. Herold, Monroeville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/414,970

(22) Filed: May 17, 2019

(65) Prior Publication Data

US 2019/0270834 A1 Sep. 5, 2019

Related U.S. Application Data

(63) Continuation of application No. 15/677,490, filed on Aug. 15, 2017, now Pat. No. 10,294,318.

(60) Provisional application No. 62/375,594, filed on Aug. 16, 2016.

(51) Int. Cl.
*C08F 236/20* (2006.01)
*C08F 218/16* (2006.01)
*G02B 1/04* (2006.01)

(52) U.S. Cl.
CPC .......... *C08F 236/20* (2013.01); *C08F 218/16* (2013.01); *G02B 1/04* (2013.01); *G02B 1/041* (2013.01)

(58) Field of Classification Search
CPC ........ C08F 236/20; C08F 218/16; G02B 1/04; G02B 1/041
USPC ....................................................... 526/227
See application file for complete search history.

(56) References Cited

U.S. PATENT DOCUMENTS

| | | | |
|---|---|---|---|
| 4,521,577 A | 6/1985 | Romano et al. | |
| 4,835,233 A | 5/1989 | Renzi et al. | |
| 5,316,570 A | 5/1994 | Blonski | |
| 6,057,411 A | 5/2000 | Herold | |
| 6,812,265 B1 | 11/2004 | Renzi et al. | |
| 7,214,754 B2 | 5/2007 | Nagpal | |
| 7,696,371 B2 | 4/2010 | Davis et al. | |
| 2004/0236064 A1 | 11/2004 | Ooga et al. | |
| 2012/0041169 A1 | 2/2012 | Fuertes et al. | |
| 2017/0001971 A1 | 1/2017 | Stensrud et al. | |
| 2017/0002019 A1* | 1/2017 | Stensrud | C07C 67/343 |
| 2017/0066876 A1 | 3/2017 | Herold et al. | |

FOREIGN PATENT DOCUMENTS

| | | |
|---|---|---|
| CN | 1426428 A | 6/2003 |
| CN | 1522374 A | 8/2004 |
| CN | 1708520 A | 12/2005 |
| CN | 101319024 A | 12/2008 |
| EP | 0227178 A2 | 7/1987 |
| JP | 2001527139 A | 12/2001 |
| JP | 2003221417 A | 8/2003 |
| WO | 0027794 A1 | 5/2000 |
| WO | 0078832 A1 | 12/2000 |
| WO | 2015094716 A1 | 6/2015 |
| WO | 2015095710 A1 | 6/2015 |

OTHER PUBLICATIONS

Tadokoro et al., "Investigation of shrinkage and cracking of ophthalmic lens coating by a cycle test of UV radiation and high humidity", Thin Solid Films, 2012, pp. 4169-4173, vol. 520, Issue 12.

* cited by examiner

*Primary Examiner* — William K Cheung
(74) *Attorney, Agent, or Firm* — The Webb Law Firm

(57) ABSTRACT

A polymerizable composition includes the reaction product of an isohexide bischloroformate, at least one polyol, allyl alcohol, and, optionally, at least one polychloroformate. An exemplary polymerizable composition includes (a) the transesterification reaction product of an isohexide, diallyl carbonate, and at least one polyol; and (b) organic peroxide. A polymerizate including the polymerizable composition and an optical article including the polymerizable composition are also provided.

11 Claims, No Drawings

POLYMERIZABLE COMPOSITION FOR OPTICAL ARTICLES

CROSS REFERENCE TO RELATED APPLICATIONS

This application is a continuation application of U.S. application Ser. No. 15/677,490, filed Aug. 15, 2017, now U.S. Pat. No. 10,294,318, issued May 21, 2019, which application claims priority to U.S. Provisional Application No. 62/375,594, filed Aug. 16, 2016, both of which are herein incorporated by reference in their entirety.

BACKGROUND OF THE INVENTION

Field of the Invention

This invention relates generally to polymerizable compositions which are particularly well suited for optical articles.

Technical Considerations

Allyl carbonate monomer compositions can be polymerized to use as transparent coatings, optical lenses, and other optical elements. Diethylene glycol bis(allyl carbonate) monomer compositions have been produced by reacting diethylene glycol with phosgene at temperatures between 0° C. and 20° C. to form the corresponding dichloroformate, which is then reacted with allyl alcohol in the presence of a suitable acid acceptor, for example, pyridine, a tertiary amine, or an alkali or alkaline earth metal hydroxide. Alternatively, the allyl alcohol is reacted with phosgene. The resulting chloroformate is reacted with diethylene glycol in the presence of an alkaline reagent.

One problem associated with the polymerization of the known diethylene glycol bis(allyl carbonate) monomer compositions is the relatively high shrinkage of the polymerized material, which occurs during the course of polymerization to the final thermoset polymer. For example, there can be a shrinkage of greater than 13 percent during the polymerization of conventional diethylene glycol bis(allyl carbonate) monomers. Shrinkage to such a degree is particularly detrimental in casting operations, such as those used to produce ophthalmic lenses and ophthalmic lens blanks, where the liquid monomer composition is introduced into a mold and then is polymerized to form a thermoset polymerizate. This shrinkage can result in commercially unacceptable products that must be rejected, thus decreasing yield of the manufacturing process.

It is known that shrinkage in the mold may be reduced by introducing a liquid prepolymer into the mold and then polymerizing the prepolymer to the final thermoset polymerizate. In this known process, the prepolymer is produced by partially polymerizing the diethylene glycol bis(allyl carbonate) monomer composition to consume a portion of the polymerizable ethylenic double bonds.

Low shrinkage in the mold is favored by utilizing a large number of polymerizable ethylenic double bonds during partial polymerization to produce the prepolymer, which is introduced into the mold. However, during the partial polymerization of the diethylene glycol bis(allyl carbonate) monomer compositions, the viscosity generally increases as polymerizable ethylenic double bonds are consumed. For practical purposes, the viscosity should not become so high that the resulting prepolymer does not flow reasonably readily into the mold. Viscosity of the prepolymer, therefore, provides a practical lower limit to shrinkage in the mold.

Production of the prepolymer also can cause processing difficulties, such as potential gelling of the reactor. Production costs can be reduced and numerous problems can be avoided by eliminating the pre-thickening step.

Another challenge with conventional low shrinkage compositions is that, when polymerized, they typically have increased length between crosslinks, which results in soft polymerizates.

Therefore, it would be desirable to provide a composition that enhances or optimizes the balance between the final polymer's physical properties, such as stiffness, and the amount of polymerization shrinkage, such that the final polymer is rigid enough to be used in various applications, such as conventional optical applications.

SUMMARY OF THE INVENTION

It is believed that the invention results in polymerizable compositions which provide improved shrinkage polymerizates with improved stiffness.

A polymerizable composition comprises at least one first monomer comprising an isohexide bis(allyl carbonate) monomer and at least one ethylenically unsaturated second monomer.

Another polymerizable composition comprises the reaction product of (a) an isohexide bischloroformate; (b) at least one polyol; (c) allyl alcohol; and (d) optionally, at least one polychloroformate.

A further polymerizable composition comprises the transesterification reaction product of (a) an isohexide; (b) diallyl carbonate; and (c) at least one polyol.

The addition of isohexide bis(allyl carbonate) to a monomer or a mixture of monomers comprising one or more ethylenic unsaturations, for the purpose of casting optical lenses, is expected to improve stiffness (e.g., Fischer microhardness, or storage modulus at room temperature or elevated temperatures, as measured by Dynamic Mechanical Analysis (DMA)), and/or help reduce polymerization shrinkage. In particular, the addition of isohexide bis(allyl carbonate) is expected to improve the stiffness of lenses cast with a monomer system which has been modified for reduced polymerization shrinkage (e.g., Reaction Product 1 disclosed in this specification).

DESCRIPTION OF THE INVENTION

All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range. The terms "polymer" or "polymeric" include oligomers, homopolymers, copolymers, and terpolymers.

The invention comprises, consists of, or consists essentially of the following aspects of the invention, in any combination.

The invention relates to a polymerizable composition for preparing optical articles.

For example, the invention can comprise a polymerizable composition comprising at least one first monomer comprising an isohexide bis(allyl carbonate) monomer and at least one ethylenically unsaturated second monomer (i.e., a monomer comprising one or more ethylenic unsaturations). The isohexide bis(allyl carbonate) monomer can be selected from the group consisting of isosorbide bis(allyl carbonate), isoidide bis(allyl carbonate), isomannide bis(allyl carbonate), and mixtures thereof.

There are several ways to synthesize isohexide bis(allyl carbonate). Examples of synthetic routes that can be used are depicted below as Schemes I-III. One skilled in the art would expect that such synthetic routes may result in a reaction product mixture that may include some partially reacted functional groups as well as small amounts of unreacted and/or oligomeric products.

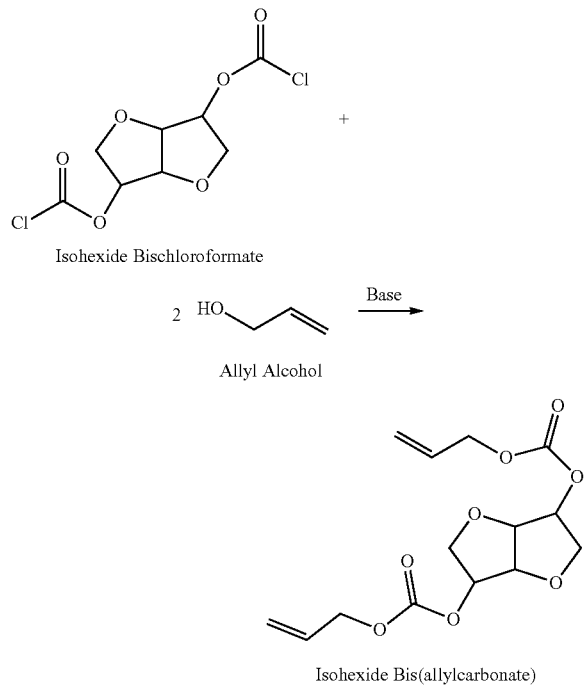

Scheme I

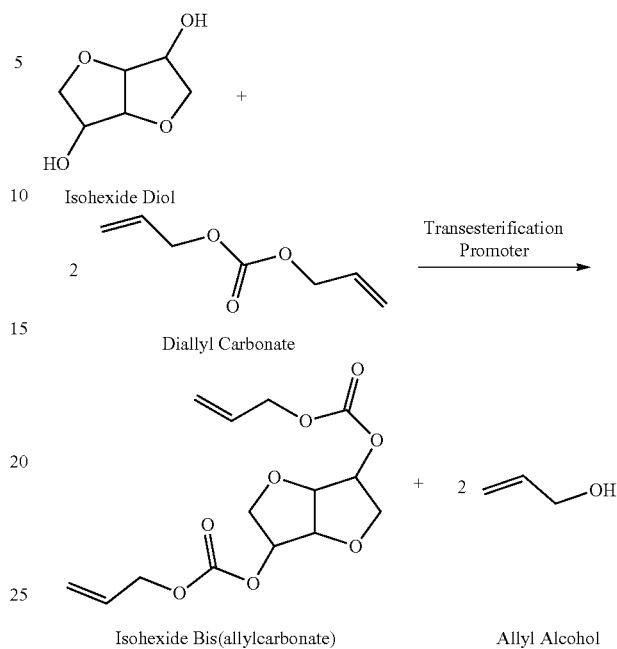

Scheme III

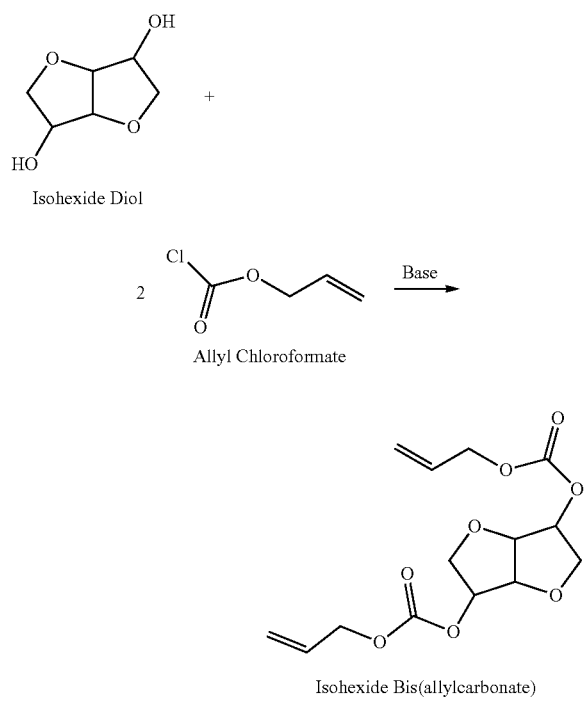

Scheme II

The isohexide can be selected from isosorbide, isoidide, isomannide, and mixtures thereof.

Isohexide bischloroformate can be prepared by reacting isohexide with phosgene according to methods known to those skilled in the art, such as those methods disclosed in U.S. Pat. No. 7,696,371 at column 3, line 67 through column 7, line 7; and column 13, line 37 through column 14, line 68.

Isohexide bischloroformate can be reacted with allyl alcohol in the presence of a base, as depicted in Scheme I above. The amount of allyl alcohol is relative to the total amount of isohexide bischloroformate present. For example, allyl alcohol can be present in the range of 1 to 2 equivalent (eq.) of OH to 1 eq. of chloroformate, such as 1 to 1.5 eq. of OH to 1 eq. of chloroformate. The hydroxyls initially present in the mixture are from the allyl alcohol. The chloroformates present in the mixture are from the isohexide bischloroformate.

The base can be selected from bases known in the art. For example, the base can be selected from the group consisting of sodium hydroxide, potassium hydroxide, sodium methoxide, potassium methoxide, triethylamine, pyridine, and mixtures thereof. A neutralizing amount of base can be used. Base can be present in the range of 1 to 2 eq. of base to 1 eq. of chloroformate, such as 1 to 1.5 eq. of base to 1 eq. of chloroformate.

The reaction temperature can be in the range of −10° C. to 60° C., such as 0° C. to 20° C.

In a further embodiment, depicted in Scheme II above, isohexide diol can be reacted with allyl chloroformate in the presence of a base. The amount of isohexide diol is relative to the total amount of allyl chloroformate present. For example, isohexide diol can be present in the range of 0.9 to 1.1 eq. of OH to 1 eq. of chloroformate, such as 1.0 to 1.05 eq. of OH to 1 eq. of chloroformate. The hydroxyls initially present in the mixture are from the isohexide alcohol. The chloroformates present in the mixture are from the allyl chloroformate.

The base can be selected from any of those previously described. A neutralizing amount of base can be used. Base can be present in the range of 1 to 2 eq. of base to 1 eq. of chloroformate, such as 1 to 1.5 eq. of base to 1 eq. of chloroformate.

The reaction temperature can be in the range of −10° C. to 50° C., such as 0° C. to 25° C.

In a further embodiment, depicted in Scheme III above, isohexide diol can be reacted with diallyl carbonate in the presence of a transesterification promoter, according to procedures disclosed in WO 2015/094716 A1 at page 13, line 30 through page 16, line 3.

The allyl alcohol can be removed by continuous distillation as it is formed during the reaction, and any non-reacted diallyl carbonate can be removed by distillation at the end of the reaction.

The amount of diallyl carbonate is relative to the total amount of isohexide diol. For example, diallyl carbonate can be present in the range of 1 to 50 eq. of diallyl carbonate to 1 eq. of OH, such as 1.1 to 15 eq. of diallyl carbonate to 1 eq. of OH. The hydroxyls present in the mixture are from the isohexide diol.

A transesterification promoter can be included, such as one or more of those selected from hydroxides, carbonates, and alkoxides of alkali metals or alkaline earth metals, hydrides of alkali metals or alkaline earth metals, lithium hydroxide, sodium hydroxide, potassium hydroxide, sodium methoxide, potassium methoxide, sodium carbonate, potassium carbonate, calcium carbonate, barium carbonate, cesium carbonate, sodium hydride, potassium hydride, or calcium hydride, amine catalysts (e.g., triethylamine, tributylamine, diisopropylethylamine, pyridine, pyrimidine, dimethylaminopyridine, imidazole, pyrrolidine, or morpholine), organic bases, basic ion-exchange resins, acid catalysts (e.g., sulfuric acid, phosphoric acid, or paratoluenesulfonic acid), and transesterification catalysts such as those disclosed in U.S. Publication No. 2012/0041169A1 at paragraphs [0028] through [0038] and WO 2015/094716 A1 at page 6, lines 9 to 16 and lines 19 to 21; and page 8, lines 28 to 32.

The transesterification promoter can be used in an amount equal to at least 1 part per million by weight with respect to the weight of the mixture of materials, such as from 0.01% to 0.3% by weight. For example, the amount of transesterification promoter can range from 0.0001 to 5 eq. per 1 eq. of OH. The amount of transesterification promoter can be as disclosed in U.S. Publication No. 2012/0041169A1 at paragraph [0036] and WO 2015/094716 A1 at page 6, lines 16 to 18. The hydroxyls present in the mixture are from the isohexide diol.

The reaction temperature should be greater than or equal to the boiling point of allyl alcohol, or greater than or equal to the boiling point of the azeotropic mixture which allyl alcohol forms with another of the components present in the reaction mixture, and less than or equal to the boiling point of diallyl carbonate, depending upon the pressure at which the reaction is carried out. Generally, the reaction temperature can be in the range of 50° C. to 180° C., such as 80° C. to 150° C.

The transesterification reaction can be carried out at such pressure as to adjust the boiling point of the mixture to a preselected operating temperature, in order to favor the elimination of the allyl alcohol from the reaction mixture, for example, pressures ranging from 5 mbar to 1030 mbar, such as from 50 mbar to 500 mbar.

The second monomer in the polymerizable composition can be selected from the group consisting of ethyleneglycol bis(allyl carbonate), diethyleneglycol bis(allyl carbonate), triallylcyanurate, triallylisocyanurate, 1,3,5-tris(2-hydroxyethyl)isocyanuratetris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof. In a particular embodiment, the second monomer in the polymerizable composition can be selected from the group consisting of ethyleneglycol bis(allyl carbonate), diethyleneglycol bis(allyl carbonate), and mixtures thereof.

In another embodiment, the second monomer can comprise the reaction product of at least one of a bischloroformate or a trischloroformate; allyl alcohol; and at least one polyol. The bischloroformate or trischloroformate can comprise bischloroformate or trischloroformate of any of the diols or triols described herein. The bischloroformate or trischloroformate of diol or triol can be prepared by reacting diol or triol with phosgene according to methods known to those skilled in the art, or methods disclosed in U.S. Pat. No. 7,696,371 at column 3, line 67 through column 7, line 7; and column 13, line 37 through column 14, line 68. The bischloroformate can be a bischloroformate of glycol or glycol ether. The bischloroformate can be selected from the group consisting of ethyleneglycol bischloroformate, diethyleneglycol bischloroformate, and mixtures thereof. One non-limiting example of a suitable trischloroformate is 1,3,5-tris (2-chloroformyloxyethyl)isocyanurate.

Polyols suitable for use in the present invention can have at least two and up to ten hydroxyl groups, such as up to six hydroxyl groups. The polyol can be aromatic or aliphatic, linear, branched, or cyclic, and can optionally have heteroatoms in which at least one carbon, and less than all of the carbons, is replaced with a heteroatom, such as, but not limited to, sulfur, nitrogen, and/or oxygen. Suitable polyols can include, but are not limited to, those derived from ethers, thioethers, or tertiary amines. The polyol can be a cyclic polyol, such as 1,3,5-tris(2-hydroxyethyl)isocyanurate. The polyol also can be a $C_2$-$C_{12}$ diol. Additionally, the polyol can be selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, mesoerythritol, xylitol, sorbitol, ethoxylates thereof, propoxylates thereof, and mixtures thereof. Other suitable polyols include, but are not limited to, 2,2-Bis(4-hydroxyphenyl) propane (Bisphenol A); 4,4'-(1-Phenylethylidene)bisphenol (Bisphenol AP); 2,2-Bis(4-hydroxyphenyl)butane (Bisphenol B); 1,1-Bis(4-hydroxyphenyl)-1,1-diphenylmethane (Bisphenol BP); 1,1-Bis(4-hydroxyphenyl)ethane (Bisphenol E); Bis(2-hydroxyphenyl)methane; 4,4'-Methylenediphenol (Bisphenol F); 9,9-Bis(4-hydroxyphenyl)fluorene (Bisphenol FL); Bis(4-hydroxyphenyl) sulfone (Bisphenol S); 4,4'-Cyclohexylidenebisphenol (Bisphenol Z); Bis(2-hydroxyphenyl)methane; Tetrabromobisphenol A and mixtures of such isomers; 3,3',5,5'-Tetrabromobisphenol A; 4,4'-Sulfonylbis(2-methylphenol); 4,4'-Sulfonyldiphenol; 4,4'-Thiodiphenol; Dihydroxybiphenyl and mixtures of such isomers; 4,4'-Dihydroxybiphenyl; 2,2'-Biphenol; Dihydroxybenzene and mixtures of such isomers; 1,2-dihydroxybenzene; 1,3-dihydroxybenzene; 1,4-dihydroxybenzene; alkoxylated, ethoxylated, propoxylated, or glycerolated versions of the aforementioned; and combinations or mixtures of the above.

The amount of allyl alcohol and polyol are relative to the total amount of chloroformates present. For example, allyl alcohol can be present in the range of 0.2 to 1.99 eq. of OH to 1 eq. of chloroformate, such as 0.8 to 1.2 eq. of OH to 1 eq. of chloroformate. A minimum amount of allyl alcohol can be present in the range of 0.2 to 0.7 eq. of OH to 1 eq. of chloroformate. For example, polyol can be present in the range of 0.01 to 0.6 eq. of OH to 1 eq. of chloroformate, such as 0.025 to 0.3 eq. of OH to 1 eq. of chloroformate. The equivalents ratio of total equivalents of hydroxyls to total equivalents of chloroformate can be in the range of 1 to 2:1, such as 1 to 1.5:1. The hydroxyls present in the mixture are from the allyl alcohol and polyol.

Additionally, the second monomer can comprise the transesterification reaction product of diallyl carbonate and at least one polyol. The polyol can be any of those previously described. A transesterification promoter can be included, such as one or more of those previously described. The amount of transesterification promoter can be as previously described.

The polymerizable composition can further comprise at least one third monomer, where the third monomer is different than the second monomer. Suitable examples of such third monomer can be selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

The present invention also provides for a polymerizable composition comprising the reaction product of (a) an isohexide bischloroformate; (b) at least one polyol; (c) allyl alcohol; and (d) optionally, at least one polychloroformate.

The isohexide bischloroformate can be selected from the group consisting of isosorbide bischloroformate, isoidide bischloroformate, isomannide bischloroformate, and mixtures thereof. The polyol can be selected from any of those previously described and mixtures thereof.

If present, the optional at least one polychloroformate can be selected from the group consisting of ethyleneglycol bischloroformate and diethyleneglycol bischloroformate.

The amount of allyl alcohol and polyol are relative to the total amount of chloroformates present. For example, allyl alcohol can be present in the range of 0.2 to 1.99 eq. of OH to 1 eq. of chloroformate, such as 0.8 to 1.2 eq. of OH to 1 eq. of chloroformate. A minimum amount of allyl alcohol can be present in the range of 0.2 to 0.7 eq. of OH to 1 eq. of chloroformate. For example, polyol can be present in the range of 0.01 to 0.6 eq. of OH to 1 eq. of chloroformate, such as 0.025 to 0.3 eq. of OH to 1 eq. of chloroformate. The equivalents ratio of total equivalents of hydroxyls to total equivalents of chloroformate can be in the range of 1 to 2:1, such as 1 to 1.5:1. The hydroxyls present in the mixture are from allyl alcohol and polyol. The chloroformates present in the mixture are from isohexide bischloroformate and polychloroformate, if present.

The present invention also provides for a polymerizable composition comprising the reaction product obtained from transesterification of at least one isohexide; diallyl carbonate; and at least one polyol. The polyol can be any of those previously described. A transesterification promoter also can be included, such as any of those previously described.

Polymerization of the polymerizable composition of the invention may be accomplished by adding to the composition an initiating amount of material capable of generating free radicals, i.e., an initiator. Examples of suitable initiators can include, but are not limited to, organic peroxy compounds. Methods for polymerizing polyol(allyl carbonate) compositions are well known to the skilled artisan and any of those well-known techniques may be used to polymerize the polymerizable compositions of the invention.

Suitable examples of radical initiators that may be used can include organic peroxides such as peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, and p-chlorobenzoyl peroxide; peroxyesters such as t-butylperoxy pivalate, t-butylperoxy octylate, t-butylperoxyisobutyrate, dicyclohexylperoxydicarbonate, 1,1-di(tert-butylperoxy)-cyclohexane, and 1,1-di(tert-butylperoxy)-3,3,5-trimethylcyclohexane; methyl ethylketone peroxide, acetylcyclohexane sulfonyl peroxide, and mixtures thereof. Suitable initiators are those that do not discolor the resulting polymerizate.

The amount of initiator used to initiate and polymerize the polymerizable compositions of the invention may vary and will depend on the particular initiator used. An initiating amount of the initiator, i.e., the amount needed to initiate and sustain the polymerization reaction, may be utilized. However, more than the initiating amount can be used. For example, the amount of initiator and the consequent cure cycle can be selected to produce a polymerizate having a Fischer microhardness of at least 5, for example, at least 20. The Fischer microhardness can be, e.g., in the range of 20 to 150. The Fischer microhardness can be determined by testing according to ISO 14577-07 using a FISCHER-SCOPE® H-100SMC available from Fischer Technology, Inc. Typically, the cure cycle involves heating the polymerizable organic composition in the presence of the initiator at temperatures ranging from room temperature up to a temperature of 70° C. to 130° C. over a period of 15 hours to 30 hours.

Various conventional additives may be incorporated into the polymerizable composition of the invention. Such conventional additives may include light stabilizers, heat stabilizers, ultraviolet light absorbers, mold release agents, dyes, pigments, flexibilizing additives that are not radically polymerizable, e.g., alkoxylated phenol benzoates and poly (alkylene glycol) dibenzoates, antioxidants such as hindered phenol antioxidants, and polymerization inhibitors or shelf-life stabilizers such as 4-methoxyphenol (MEHQ), 2,6-bis (1,1-dimethylethyl)-4-methylphenol (BHT), or triphenyl phosphite. Conventional additives can be present in amounts totaling less than 10 percent by weight, such as less than 5 percent by weight, such as less than 1 percent by weight, based on the total weight of the polymerizable composition.

Polymerizates of the polymerizable compositions of the present invention are suitable for use as molded or cast solid polymeric articles. Such solid articles include, but are not limited to, optical lenses, such as plano and ophthalmic lenses, sun lenses or sunglasses. Further, solid polymeric articles can be prepared from the polymerizable compositions of the invention, e.g., display screens, windows, and automotive and/or aerospace transparencies.

General Casting Procedure

An exemplary casting procedure is as follows. 20.0 grams of the monomer(s) and 1.0 gram of Trigonox ADC-NS60 peroxide initiator (which is a mixture of peroxydicarbonates supplied as a 60% solution in diethylene glycol bis(allyl carbonate), available from Akzo Nobel Polymer Chemicals LLC) would be placed in a small plastic bottle and thoroughly mixed together for approximately 15 minutes using a magnetic stirrer. The resulting solution would be filled into a mold assembly having two flat disk-shaped tempered glass molds (approximately 80 mm in diameter), a PVC gasket (i.e., a spacer to control the thickness of the final cured part, such as approximately 3.4 mm, for example), and a clamp. The mold assembly would be placed in a programmable oven to be cured.

Polymerization Shrinkage

The amount of polymerization shrinkage can be calculated according to the equation shown below, using the monomer density and polymer density, both measured at 25° C.:

$$\% \text{ Shrinkage} = [(\text{polymer density} - \text{monomer density}) / \text{polymer density}] \times 100\%$$

The percent shrinkage for the polymerizable compositions of the invention is expected to be, for example, less than 15%, such as less than 13.5%, such as less than 12%, such as less than 11.5%.

Fischer Microhardness

The Fischer microhardness can be determined by testing according to ISO 14577-07 using a FISCHERSCOPE® H-100SMC (available from Fischer Technology, Inc.). The Fischer microhardness of polymerizates (±3 Newtons/mm$^2$) can be measured at a load of 300 milliNewton (mN), following a load application of 0-300 mN in 15 seconds. The Fischer microhardness is expected to generally be at least 5, such as at least 30, such as at least 60, such as at least 80.

DMA Analysis

The DMA analysis can be carried out according to ASTM D5023 "Standard Test Method for Plastics: Dynamic Mechanical Properties: In Flexure (Three-Point Bending)", using a Perkin Elmer Diamond DMA. The storage modulus measured at 75° C. can be reported as "DMA E' @ 75° C.". The DMA E' @ 75° C. is expected to generally be at least 0.01, such as at least 0.1, such as at least 0.2, such as at least 0.3.

Refractive Index and Abbe Number

Refractive index ($n_e^{20}$) and Abbe number (Abbe$_e$) can be measured at 546 nm (mercury e-line) according to ASTM C1648-06, using a Metricon Model 2010M Prism Coupler (available from Metricon Corp.). Refractive index results are expected to generally be within the range of 1.44 to 1.56, such as 1.49 to 1.51. The Abbe number results are expected to generally be in the range of 30 to 62, such as 50 to 60.

Polymer Yellowness Index and % Transmittance

Polymer yellowness index and % transmittance generally are measured according to ASTM E313-10 and ASTM E308, respectively, using a Hunterlab Ultrascan PRO (available from Hunter Associates Laboratory, Inc.). The path length for the samples can be equal to the sample thickness. The polymer yellowness index results, measured at a sample thickness of approximately 3.4 mm, generally are expected to be within the range of 0.2 to 10, such as 0.3 to 5, such as 0.4 to 1.5. The % transmittance results generally are expected to be in the range of 80% to 95%, such as 85% to 93%, such as 90% to 92.5%.

PROPHETIC EXAMPLES

The following prophetic examples are presented to describe some of the anticipated reaction mixtures and some of the anticipated reaction products as disclosed herein. It is to be appreciated that the invention is not limited to these specific prophetic examples.

Synthesis of Isosorbide Bis(Allyl Carbonate) Via Reaction of Isosorbide Bischloroformate with Allyl Alcohol (Depicted in Scheme I)

Isosorbide bischloroformate would be synthesized by reacting isosorbide with phosgene, according to the method disclosed in Example 11 of U.S. Pat. No. 7,696,371, at column 13, line 37 through column 14, line 69.

As depicted in Scheme I, isosorbide bischloroformate would be reacted with allyl alcohol. A multi-neck reaction flask would be equipped with an overhead mechanical mixer, thermocouple probe, and an inlet for a motorized syringe pump. A cooling bath would be prepared by mixing water, sodium chloride, and ice chunks, and adding small pieces of dry ice as needed, in order to maintain a bath temperature of −15° C. to −17° C. Isosorbide bischloroformate (0.5 equivalent) and 0.6 equivalent of allyl alcohol would be mixed in the reaction flask, and the flask contents would then be cooled to an initial temperature of 0 to −5° C., using the cooling bath.

With vigorous stirring of the flask contents, 0.65 equivalent of 50% sodium hydroxide solution would be slowly added to the reaction mixture using the motorized syringe pump, at a rate to maintain a reaction temperature of 10° C. to 25° C.

After addition of the sodium hydroxide solution, the reaction mixture would continue to be mixed at 10° C. to 25° C., until completion of the reaction (based upon testing with chloroformate test paper, for example commercially available from DOD Technologies, Inc.). The flask contents would then continue to be mixed while being allowed to equilibrate to room temperature. Water would be added to dissolve the salt by-products, and the organic and aqueous phases would be allowed to separate. The organic phase would be washed with water in order to achieve neutral pH, and residual water and other volatiles would be removed by vacuum distillation.

Synthesis of Isosorbide Bis(Allyl Carbonate) Via Reaction of Isosorbide with Allyl Chloroformate (Depicted in Scheme II)

As depicted in Scheme II, isosorbide would be reacted with allyl chloroformate. A multi-neck reaction flask would be equipped with an overhead mechanical mixer, thermocouple probe, and addition funnel. A cooling bath would be prepared by mixing water, sodium chloride, and ice chunks, and adding small pieces of dry ice as needed, in order to maintain a bath temperature of −15° C. to −17° C. Isosorbide (0.5 equivalent), 0.65 equivalent of pyridine, and a sufficient amount of dichloromethane solvent (e.g., 75 grams) would be mixed in the reaction flask. The flask contents would then be cooled to an initial temperature of 0° C. to −5° C., using the cooling bath.

With vigorous stirring of the flask contents, 0.5 equivalent of allyl chloroformate would be added to the reaction mixture, using the addition funnel, at a rate to maintain a reaction temperature of 10° C. to 25° C.

After addition of the allyl chloroformate, the reaction mixture would continue to be mixed at 10° C. to 25° C. until completion of the reaction (based upon testing with chloroformate test paper, for example commercially available from DOD Technologies, Inc.). The flask contents would then continue to be mixed while being allowed to equilibrate to room temperature. Water would be added to dissolve the salt by-products, and the organic and aqueous phases would be allowed to separate. The organic phase would be washed with dilute hydrochloric acid solution in order to neutralize residual pyridine (as indicated by pH<7.0); followed by washing with water in order to achieve neutral pH. The dichloromethane and other volatiles would be removed by vacuum distillation.

Synthesis of Isosorbide Bis(Allyl Carbonate) Via Reaction of Isosorbide with Diallyl Carbonate (Depicted in Scheme III)

As depicted in Scheme III, isosorbide would be reacted with diallyl carbonate. A multi-neck jacketed flask, equipped with a magnetic stirrer, a thermocouple probe, and an overhead distillation column, would be charged with 0.5 equivalent (0.25 mole) of isosorbide, 1 to 4 equivalents of diallyl carbonate, and an effective amount of a 25% by weight solution of sodium methoxide catalyst in methanol (typically 0.1% to 1.5% by weight, based upon the amount of isosorbide).

The reaction would be carried out for 1 to 8 hours at a temperature of 80° C. to 110° C., and at a pressure in the range of 150 to 250 mbar, while allyl alcohol would be distilled out as it is formed.

After completion of the reaction, as indicated by collection of the anticipated amount of distilled allyl alcohol (e.g., 29 grams), the reaction mixture would be allowed to cool to room temperature, and washed with water. Residual diallyl carbonate and other volatiles would be removed by vacuum distillation, followed by filtration of the product.

Reaction Product 1—Product from Reaction of Diethylene Glycol Bischloroformate with Allyl Alcohol and Diethylene Glycol Diethylene glycol bischloroformate would be reacted with allyl alcohol and diethylene glycol according to the procedure of Comparative Example #10 in U.S. Patent Application Publication No. 2017/0066876 A1.

Reaction Product 2—Product from Reaction of Isosorbide Bischloroformate and Diethylene Glycol Bischloroformate with Allyl Alcohol and Diethylene Glycol A multi-neck reaction flask would be equipped with an overhead mechanical mixer, a thermocouple probe, and an inlet for a motorized syringe pump. A cooling bath would be prepared by mixing water, sodium chloride, and ice chunks, and adding small pieces of dry ice as needed in order to maintain a bath temperature of −15° C. to −17° C. Isosorbide bischloroformate (0.125 equivalent), 0.375 equivalent of diethylene glycol bischloroformate, 0.5 equivalent of allyl alcohol, and 0.1 equivalent of diethylene glycol would be mixed in the reaction flask, and the flask contents would be cooled to an initial temperature of 0° C. to −5° C., using the cooling bath.

With vigorous stirring of the flask contents, 0.65 equivalent of 50% aqueous sodium hydroxide solution would be slowly added to the reaction mixture using the motorized syringe pump, at a rate to maintain a reaction temperature of 10° C. to 15° C.

After addition of the sodium hydroxide, the reaction mixture would continue to be mixed at 10° C. to 15° C., until completion of the reaction (based upon testing with chloroformate test paper, for example commercially available from DOD Technologies, Inc.). The flask contents would then continue to be mixed while being allowed to equilibrate to room temperature. Water would be added to dissolve the salt by-products, and the organic and aqueous phases would be allowed to separate. The organic phase would be washed with water in order to achieve neutral pH, and residual water and other volatiles would be removed by vacuum distillation.

Reaction Product 3—Product from Reaction of Diallyl Carbonate with Isosorbide and Diethylene Glycol A multi-neck jacketed flask, equipped with a magnetic stirrer, a thermocouple probe, and an overhead distillation column, would be charged with 0.125 equivalent (0.0625 mole) of isosorbide, 0.375 equivalent (0.1875 mole) of diethylene glycol, 0.6 to 2 equivalents of diallyl carbonate, and an effective amount of a 25% by weight solution of sodium methoxide catalyst in methanol (typically 0.1% to 1.5% by weight, based upon the amount of polyols).

The reaction would be carried out for 1 to 8 hours at a temperature of 80° C. to 110° C., and at a pressure in the range of 150 to 250 mbar, while allyl alcohol would be distilled out as it is formed.

After completion of the reaction, as indicated by collection of the anticipated amount of distilled allyl alcohol (e.g., 29 grams), the reaction mixture would be allowed to cool to room temperature, and washed with water. Residual diallyl carbonate and other volatiles would be removed by vacuum distillation, followed by filtration of the product.

Casting of Polymer Samples

The reaction products of the prophetic examples above would be suitable for casting in molds to prepare a variety of molded articles, for example, optical articles.

For example, isosorbide bis(allyl carbonate) would be blended with at least one second monomer comprising one or more ethylenic unsaturations, including but not limited to those disclosed in the specification above, and cast according to the General Casting Procedure.

In another embodiment, isosorbide bis(allyl carbonate) would be blended with diethylene glycol bis(allyl carbonate), and cast according to the General Casting Procedure.

In another embodiment, isosorbide bis(allyl carbonate) would be blended with Reaction Product 1, and cast according to the General Casting Procedure.

In another embodiment, isosorbide bis(allyl carbonate) would be blended with at least one second monomer comprising one or more ethylenic unsaturations, including but not limited to those disclosed in the specification above, and at least one third monomer, including but not limited to those disclosed in the specification above, and cast according to the General Casting Procedure.

In another embodiment, Reaction Product 2 would be cast according to the General Casting Procedure.

In another embodiment, Reaction Product 3 would be cast according to the General Casting Procedure.

For example, the mold would be placed in a programmable oven and the composition would be polymerized using a cure cycle, for example, as shown in Table 1.

TABLE 1

| Cure conditions | | |
| --- | --- | --- |
| Step | Cumulative Hours | Temperature |
| 1 | 0 | 38° C. (initial) |
| 2 | 3 | 38° C. (hold @ 38° C.) |
| 3 | 12 | 58° C. (ramp from 38 to 58° C.) |
| 4 | 13.5 | 78° C. (ramp from 58 to 78° C.) |
| 5 | 16 | 78° C. (hold @ 78° C.) |
| 6 | 16.5 | 75° C. (ramp from 78 to 75° C.) |
| 7 | 20.5 | 75° C. (hold) |

The invention can be further characterized in the following numbered clauses.

Clause 1: A polymerizable composition, comprising at least one first monomer and at least one second monomer, wherein the at least one first monomer comprises an isohexide bis(allyl carbonate) monomer, and wherein the at least one second monomer comprises one or more ethylenic unsaturations.

Clause 2: The polymerizable composition of clause 1, wherein the at least one isohexide bis(allyl carbonate) monomer is selected from the group consisting of isosorbide bis(allyl carbonate), isoidide bis(allyl carbonate), isomannide bis(allyl carbonate), and mixtures thereof.

Clause 3: The polymerizable composition of clauses 1 or 2, wherein the at least one second monomer is selected from the group consisting of ethyleneglycol bis(allyl carbonate), diethyleneglycol bis(allyl carbonate), triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 4: The polymerizable composition of any of clauses 1 to 3, wherein the at least one second monomer is selected from the group consisting of ethyleneglycol bis(allyl carbonate), diethyleneglycol bis(allyl carbonate), and mixtures thereof.

Clause 5: The polymerizable composition of clause 1, wherein the at least one second monomer comprises the reaction product of:
  at least one of a bischloroformate or a trischloroformate;
  allyl alcohol; and
  at least one polyol.

Clause 6: The polymerizable composition of clause 5, wherein the bischloroformate is selected from the group consisting of ethyleneglycol bischloroformate, diethyleneglycol bischloroformate, and mixtures thereof.

Clause 7: The polymerizable composition of clauses 5 or 6, wherein the trischloroformate comprises 1,3,5-tris(2-chloroformyloxyethyl)isocyanurate.

Clause 8: The polymerizable composition of any of clauses 5 to 7, wherein the at least one polyol comprises two to six hydroxyl groups.

Clause 9: The polymerizable composition of any of clauses 5 to 7, wherein the at least one polyol comprises a cyclic polyol.

Clause 10: The polymerizable composition of clause 9, wherein the cyclic polyol comprises 1,3,5-tris(2-hydroxyethyl)isocyanurate.

Clause 11: The polymerizable composition of any of clauses 5 to 7, wherein the at least one polyol comprises a $C_2$-$C_{12}$ diol.

Clause 12: The polymerizable composition of any of clauses 5 to 7, wherein the at least one polyol is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures thereof.

Clause 13: The polymerizable composition of any of clauses 5 to 12, further comprising at least one third monomer selected from the group consisting of triallylcyanurate, triallylisocyanurate, 1,3,5-tris(2-hydroxyethyl)isocyanurate tris(allyl carbonate), trimethylolpropane tris(allyl carbonate), pentaerythritol tetra(allyl carbonate), glycerol tris(allyl carbonate), ditrimethylolpropane tetra(allyl carbonate), diallylitaconate, dipentaerythritol hexa(allyl carbonate), and mixtures thereof.

Clause 14: The polymerizable composition of clause 1, wherein the at least one second monomer comprises the transesterification reaction product of:
  diallyl carbonate; and
  at least one polyol.

Clause 15: The polymerizable composition of any of clauses 5 to 13, wherein an equivalents ratio of total equivalents of hydroxyls to total equivalents of chloroformate is 1 to 1.5:1.

Clause 16: A polymerizable composition, comprising the reaction product of:
  an isohexide bischloroformate;
  at least one polyol;
  allyl alcohol; and
  optionally, at least one polychloroformate.

Clause 17: The polymerizable composition of clause 16, wherein the isohexide bischloroformate is selected from the group consisting of isosorbide bischloroformate, isoidide bischloroformate, isomannide bischloroformate, and mixtures thereof.

Clause 18: The polymerizable composition of clauses 16 or 17, wherein the at least one polyol comprises two to six hydroxyl groups.

Clause 19: The polymerizable composition of any of clauses 16 to 18, wherein the at least one polyol comprises a cyclic polyol.

Clause 20: The polymerizable composition of clause 19, wherein the cyclic polyol comprises 1,3,5-tris(2-hydroxyethyl)isocyanurate.

Clause 21: The polymerizable composition of any of clauses 16 to 20, wherein the at least one polyol comprises a $C_2$-$C_{12}$ diol.

Clause 22: The polymerizable composition of any of clauses 16 to 21, wherein the at least one polyol is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures thereof.

Clause 23: The polymerizable composition of any of clauses 16 to 22, wherein the at least one polychloroformate is present and is selected from the group consisting of ethyleneglycol bischloroformate and diethyleneglycol bischloroformate.

Clause 24: The polymerizable composition of any of clauses 16 to 23, wherein an equivalents ratio of total equivalents of hydroxyls to total equivalents of chloroformate is 1 to 1.5:1.

Clause 25: A polymerizable composition, comprising the transesterification reaction product of:
  an isohexide;
  diallyl carbonate; and
  at least one polyol.

Clause 26: The polymerizable composition of clause 1, further comprising organic peroxide.

Clause 27: The polymerizable composition of clause 26, wherein the organic peroxide is selected from the group consisting of peroxymonocarbonate ester, peroxydicarbonate ester, diacylperoxide, and peroxyester.

Clause 28: The polymerizable composition of clause 16, further comprising organic peroxide.

Clause 29: The polymerizable composition of clause 28, wherein the organic peroxide is selected from the group consisting of peroxymonocarbonate ester, peroxydicarbonate ester, diacylperoxide, and peroxyester.

Clause 30: The polymerizable composition of clause 25, further comprising organic peroxide.

Clause 31: The polymerizable composition of clause 30, wherein the organic peroxide is selected from the group consisting of peroxymonocarbonate ester, peroxydicarbonate ester, diacylperoxide, and peroxyester.

Clause 32: A polymerizate, formed from the polymerizable composition of clause 1.

Clause 33: A polymerizate, formed from the polymerizable composition of clause 16.

Clause 34: A polymerizate, formed from the polymerizable composition of clause 25.

Clause 35: An optical article, comprising the polymerizable composition of clause 1.

Clause 36: An optical article, comprising the polymerizable composition of clause 16.

Clause 37. An optical article, comprising the polymerizable composition of clause 25.

It will be readily appreciated by those skilled in the art that modifications, as indicated above, may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof

The invention claimed is:

1. A polymerizable composition, comprising the reaction product of:
   an isohexide bischloroformate;
   at least one polyol comprising a linear or branched polyol;
   allyl alcohol; and
   optionally, at least one polychloroformate.

2. The polymerizable composition of claim 1, wherein the isohexide bischloroformate is selected from the group consisting of isosorbide bischloroformate, isoidide bischloroformate, isomannide bischloroformate, and mixtures thereof.

3. The polymerizable composition of claim 1, wherein the at least one polyol comprises two to six hydroxyl groups.

4. The polymerizable composition of claim 1, wherein the at least one polyol comprises a $C_2$-$C_{12}$ diol.

5. The polymerizable composition of claim 1, wherein the at least one polyol is selected from the group consisting of ethylene glycol, diethylene glycol, propylene glycol, 1,3-propanediol, 1,2-butanediol, 1,4-butanediol, neopentyl glycol, 2-methyl-1,3-propanediol, glycerol, trimethylolpropane, ditrimethylolpropane, pentaerythritol, dipentaerythritol, erythritol, meso-erythritol, xylitol, sorbitol, ethoxylates thereof, propoxylates thereof, and mixtures thereof.

6. The polymerizable composition of claim 1, wherein the at least one polychloroformate is present and is selected from the group consisting of ethyleneglycol bischloroformate and diethyleneglycol bischloroformate.

7. The polymerizable composition of claim 1, wherein an equivalents ratio of total equivalents of hydroxyls to total equivalents of chloroformate is 1 to 1.5:1.

8. The polymerizable composition of claim 1, further comprising organic peroxide.

9. The polymerizable composition of claim 8, wherein the organic peroxide is selected from the group consisting of peroxymonocarbonate ester, peroxydicarbonate ester, diacylperoxide, and peroxyester.

10. A polymerizable composition, comprising:
    (a) the transesterification reaction product of an isohexide, diallyl carbonate, and at least one polyol; and
    (b) organic peroxide.

11. The polymerizable composition of claim 10, wherein the organic peroxide is selected from the group consisting of peroxymonocarbonate ester, peroxydicarbonate ester, diacylperoxide, and peroxyester.

* * * * *